United States Patent [19]
Smesko et al.

[11] Patent Number: 5,902,696
[45] Date of Patent: May 11, 1999

[54] SEPARATOR FOR NONAQUEOUS ELECTROCHEMICAL CELLS

[75] Inventors: Sally Ann Smesko, North Tonawanda; Esther S. Takeuchi, East Amherst, both of N.Y.

[73] Assignee: Wilson Greatbatch Ltd., Clarence, N.Y.

[21] Appl. No.: 08/867,169

[22] Filed: Jun. 2, 1997

[51] Int. Cl.[6] .................................................. H01M 2/16
[52] U.S. Cl. ..................... 429/142; 429/249; 429/250; 429/218.1; 429/221; 429/224
[58] Field of Search ................................... 429/209, 249, 429/142, 250, 221, 224, 218.1

[56] References Cited

U.S. PATENT DOCUMENTS

| | | | |
|---|---|---|---|
| 3,661,645 | 5/1972 | Strier et al. | 136/20 |
| 4,190,707 | 2/1980 | Doi et al. | 429/254 |
| 4,201,838 | 5/1980 | Goldberg | 429/145 |
| 4,273,840 | 6/1981 | Machi et al. | 429/144 |
| 4,359,510 | 11/1982 | Taskier | 429/144 |
| 4,438,185 | 3/1984 | Taskier | 429/250 |
| 4,552,821 | 11/1985 | Gibbard et al. | 429/57 |
| 4,629,666 | 12/1986 | Schlaikjer | 429/194 |
| 4,740,433 | 4/1988 | Lu | 429/94 |
| 4,789,609 | 12/1988 | Ambrose-Ritchey et al. | 429/144 |
| 5,002,843 | 3/1991 | Cieslak et al. | 429/101 |
| 5,318,866 | 6/1994 | Degen et al. | 429/254 |
| 5,543,249 | 8/1996 | Takeuchi et al. | 429/217 |
| 5,716,728 | 2/1998 | Smesko et al. | 429/60 |

*Primary Examiner*—Maria Nuzzolillo
*Assistant Examiner*—Laura Weiner
*Attorney, Agent, or Firm*—Hodgson, Russ, Andrews, Woods & Goodyear LLP

[57] ABSTRACT

A combination separator comprising a single layer of a non-woven, polyolefinic cloth superposed with a single layer of a polyolefinic, microporous film for use in an electrochemical cell, is described. A preferred polyolefinic material for both the non-woven cloth and the microporous film is polypropylene. The redundancy of using two layers of separator is an enhanced safety characteristic of the cell; however, the use of the polypropylene web/film combination adds another dimension to the cell's safety characteristics by imparting the benefits of each type of material.

29 Claims, 5 Drawing Sheets

SEPARATOR FOR NONAQUEOUS ELECTROCHEMICAL CELLS

BACKGROUND OF THE INVENTION

1. Field of the Invention

The present invention generally relates to the conversion of chemical energy to electrical energy and, more particularly, to a combination separator provided to electrically insulate the anode from the cathode in an electrochemical cell. The combination separator comprises at least one layer of a flexible, non-woven polyolefinic cloth superposed with at least one layer of a flexible, microporous polyolefinic film. A preferred polymeric material for both the non-woven cloth and the film is polypropylene. A preferred superposed combination separator according to the present invention has a surfactant such as a non-ionic surfactant coated thereon, and more preferably coated on the film. An electrochemical cell includes an alkali metal primary or secondary cell having the present combination separator intermediate the electrodes to provide physical separation therebetween.

2. Prior Art

Conventionally, separators have fallen into two general categories—those made of microporous films and those in the form of a cloth made from various materials including polymeric fibers. Whether a separator is comprised of a microporous film or a cloth material, a fundamental requirement is that the material of construction be resistant to degradation in the cell environment, have sufficient thickness to maintain interelectrode separation without interfering with cell discharge performance, and exhibit sufficient surface energy such that electrolyte wettability and absorption are augmented. The separator material must also have a relatively high electrical resistivity in order to prohibit the establishment of short circuit currents flowing directly between the electrodes through the separator.

An example of a film separator is shown in U.S. Pat. No. 4,629,666 to Schlaikjer, which discloses partially halogenated microporous polymeric films for use as separators in electrochemical cells containing alkali metals, such as lithium, and inorganic electrolytes. Similarly, a microporous film separator comprising polytetrafluoroethylene (PTFE) is disclosed in U.S. Pat. No. 3,661,645 to Strier et al. The benefit is that microporous films can be made very thin which contributes to volumetric efficiency in that the separator does not detract appreciably from the volume of cathode and anode active materials and therefore the energy density. The problem is that reduction in separator thickness is accompanied by a reduction in material strength as microporous films, including those made of polytetrafluoroethylene, can be weak and susceptible to tearing. As previously discussed, tensile properties are important in selecting a separator, and it is not uncommon for film separators to rupture during the manufacturing process, which can lead to contact between the electrode materials and result in an internal short circuit condition.

The separator also must have sufficient porosity such that electrode separation is maintained while allowing ionic transfer within the electrolyte to occur unimpeded during intended cell discharge. Cloth separators are relatively porous structures. An exemplary cloth separator is shown in U.S. Pat. No. 5,002,843 to Cieslak et al., which discloses a lithium/thionyl chloride electrochemical cell system having a separator made of aramid fibers provided in a non-woven mat form. Although non-woven mats are highly porous and, therefore, not a detriment to ionic transfer within the depolarizer/catholyte, their inherent porosity may allow small particles of electrode material to migrate through the separator. As is the case with microporous films, the use of a non-woven cloth as a separator in an electrochemical cell can result in direct physical contact between the electrodes, which would give rise to an internal short circuit condition.

The above requirements are balanced by the need that the separator have sufficiently strong tensile properties to facilitate cell fabrication and to further withstand internal cell stresses due to changes in electrode volume during discharge, and during re-charging cycles in secondary electrochemical cells. Polytetrafluoroethylene has high tensile strength and is, therefore, desirable for use as a separator material in some cell chemistries, especially when provided in a cloth form. To complicate matters, however, it is known that alkali metals such as lithium are reactive in contact with fluorinated carbon ($CF_x$) electrode active materials and polytetrafluoroethylene separators. Contact between lithium metal electrodes and polytetrafluoroethylene separators can generate sparks and possibly sufficient heat to cause fire. Furthermore, while fluorinated carbons ($CF_x$) are useful as cathode active materials, and especially in cells intended to be discharged under a light load for extended periods of time such as for routine monitoring of cardiac functions by an implantable cardiac defibrillator and the like, it is imperative that physical separation is maintained between lithium and the cathode material without the provision of polytetrafluoroethylene as a separator material due to the potential for excessive heat generation when fluorinated carbon active materials are contacted with alkali metals.

The separator combination of the present invention has excellent tensile properties while allowing ionic transfer within electrolyte to occur, but it does not include polytetrafluoroethylene. In comparison to separators made of that material, the use of one non-woven polyolefinic cloth superposed with a microporous polyolefinic film according to the present invention provides a separator combination for alkali metal cells having all of the desirable above-described attributes of a separator structure including the prevention of internal short circuit conditions without interfering with discharge performance while also allowing for the fabrication of thinner and/or smaller cell constructions.

It should be pointed out that an alkali metal electrochemical cell that does not use polytetrafluoroethylene as a separator material is described in U.S. Pat. No. 4,552,821 to Gibbard et al. However, this patent describes a separator comprising at least two layers of polypropylene film used in conjunction with a non-woven fabric wicking layer. The double layers of polypropylene film are intended to minimize dendritic short circuit conditions during recharging of the disclosed nickel-zinc secondary cell. In practice, the double layers of polypropylene separator film provide a degree of redundancy that allows large pores or holes, due to imperfections produced during manufacture or subsequently, in each film to be non-aligned to minimize short circuit conditions caused by dendrite growth during cell recharging.

Hoechst Celanese Corporation, Charlotte, N.C., sells a combination separator under the designation CELGARD® 5550 comprising a layer of non-woven polypropylene laminated with a layer of polypropylene film having a blend of non-ionic and cationic surfactants coated thereon. However, it is believed that the lamination process reduces this combination separator's ability to support ion transfer therethrough.

As previously discussed, the present alkali metal electrochemical cell can comprise either a primary cell or a secondary, rechargeable cell. A most preferred form of the present electrochemical cell includes a Li/CF$_x$ couple. In that case, it is imperative that physical separation is maintained between the respective electrode active materials to not only prevent the formation of short circuit conditions but also to preclude internal heat generation. Such an eventuality could be catastrophic.

In the present invention, redundant film layers are not desired. The present superposed non-woven cloth and microporous film provide improved strength characteristics in comparison to one or the other layer used alone and the present separator structure also prevents migration of fluorinated carbon cathode materials into short circuit contact with the anode material while still providing for cells of reduced thickness and smaller size.

SUMMARY OF THE INVENTION

The present invention is directed to a combination separator comprising a single layer of a polyolefinic, non-woven cloth superposed with a single layer of a microporous, polyolefinic film. Preferably a non-ionic surfactant is coated on the microporous film. This separator combination is thinner than conventional separators using two layers of non-woven material, and that allows for the fabrication of thinner and/or smaller cells than were previously known prior to the present invention. The superposed separator combination is especially useful in Li/CF$_x$ cells to preclude the possibility of short circuit conditions between the active electrode components. Not only does a short circuit destroy the cell's electrical discharge functionality, but it is known that alkali metals contacted to certain fluorinated carbonaceous materials including electrode active fluorinated carbons can generate heat inside the cell. For that reason, prevention of contact between lithium metal anodes and fluorinated carbonaceous electrode active materials without the provision of a polytetrafluoroethylene separator is paramount for proper cell discharge.

These and other aspects of the present invention will become increasingly more apparent to those skilled in the art by reference to the following description and to the drawings.

DETAILED DESCRIPTION OF THE INVENTION

Figure 1:
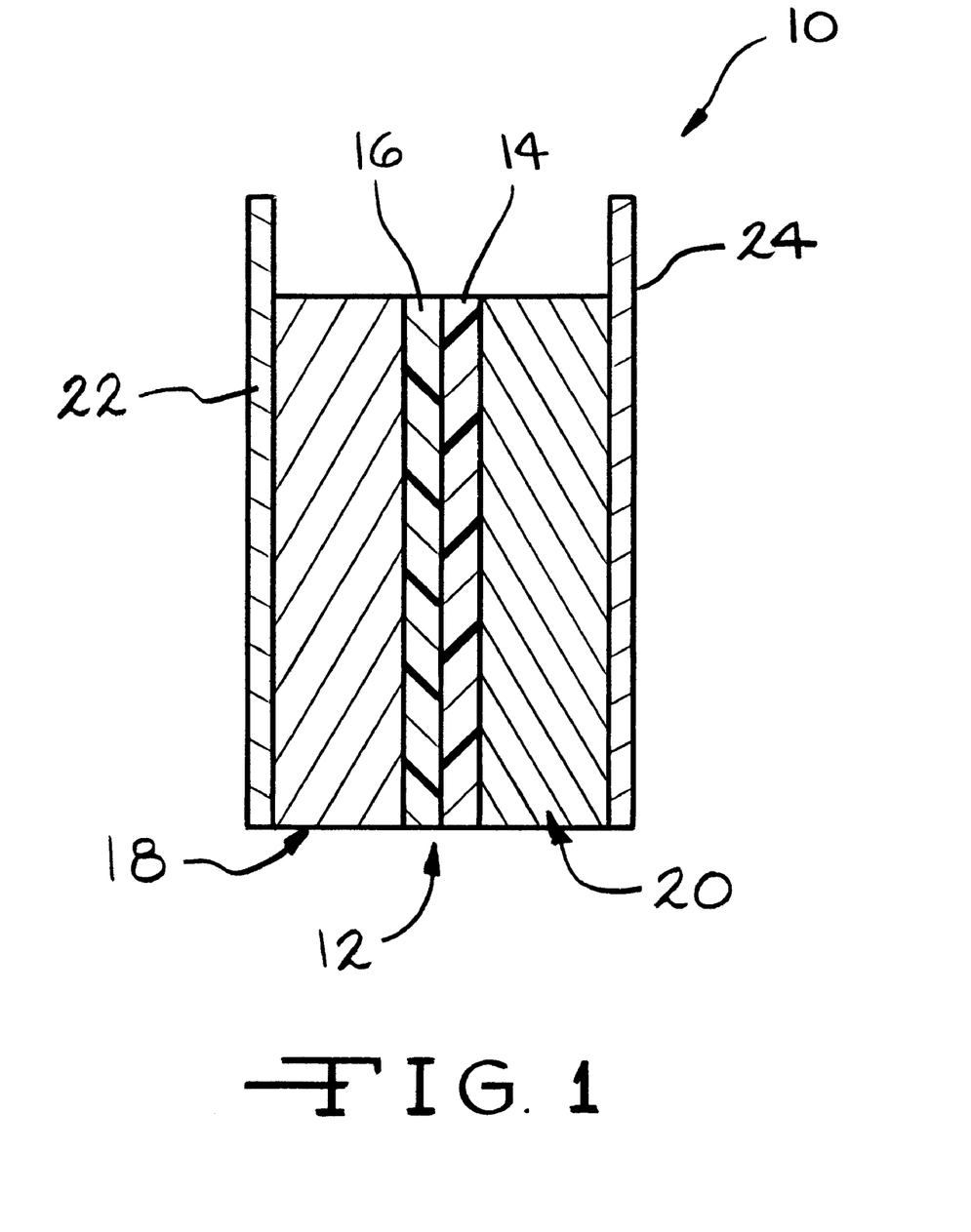
FIG. 1 is a diagrammatic view of an electrochemical cell 10 provided with a separator 12 according to the present invention.

Referring now to the drawings, FIG. 1 shows an exemplary electrochemical cell 10 according to the present invention constructed having a separator 12 comprising one layer of a non-woven polyolefinic cloth 14 superposed with one layer of a polyolefinic film 16 to provide separation between an anode electrode 18 and a cathode electrode 20. The term "polyolefinic" is intended to describe a polymer prepared by polymerizing olefin monomers through their unsaturation.

It is known that when used alone, non-woven, polymeric cloths are very porous and being unconsolidated, may allow particles of the electrode active material to migrate therethrough. Microporous, polymeric films are themselves relatively weak; however, they are generally thinner than non-woven cloths which benefits increased cell energy density. According to the present invention, the problems of high porosity inherently characteristic in non-woven polymeric cloths and the relative weakness of microporous films are overcome by the provision of the two materials superposed in contact with each other. While such a structure is not as thin as two layers of microporous polymeric film, the somewhat increased separator thickness substantially benefits tear resistance, which is critical to proper cell operation.

As shown in FIG. 1, the combination separator 12 of the present invention is thus placed between the anode 18 and cathode 20 of the electrochemical cell 10 in a manner preventing physical contact between the electrodes. For reasons that will be explained in more detail hereinafter, the cloth layer 14 preferably faces the cathode 20 and the film 16 preferably faces the anode 18.

Anode active materials acceptable for use with the present combination separator 12 comprise metals selected from Group IA of the Periodic Table of the Elements, including lithium, sodium, potassium, calcium, magnesium or their alloys, or any alkali metal or alkali-earth metal capable of functioning as an anode. Alloys and intermetallic compounds include, for example, Li—Si, Li—Al, Li—Mg, Li—Al—Mg, Li—B and Li—Si—B alloys and intermetallic compounds. In that case, the anode active material preferably comprises lithium. The form of the anode may vary, but typically, the anode comprises a thin sheet or foil of the anode metal, and a current collector 22 contacted to the anode material. The current collector 22 includes an extended tab or lead (not shown) for connection to the negative terminal.

The cathode electrode 20 of the exemplary electrochemical cell 10 has a current collector 24 including a lead (not shown) for connection to the positive cell terminal. The conductor portion of the cathode current collector 24 is in the form of a thin sheet of metal screen, for example, a titanium, stainless steel, aluminum or nickel screen having the lead extending therefrom.

The cathode electrode 20 can comprise solid active materials such as are typically used in alkali metal/solid cathode electrochemical cells. Suitable electrode active materials include a metal, a metal oxide, a metal sulfide and carbonaceous materials, and mixtures thereof. Examples of electrode active materials that may be formed into a cathode component include, but are not limited to, manganese dioxide, copper silver vanadium oxide, silver vanadium oxide, copper vanadium oxide, titanium disulfide, copper oxide, copper sulfide, iron sulfide, iron disulfide, carbon and fluorinated carbon, and mixtures thereof. Preferably, the cathode comprises about 80 to about 99 weight percent of the electrode active material.

The combination separator 12 of the present invention is particularly useful with carbonaceous active materials prepared from fluorine and carbon including graphitic and nongraphitic forms of carbon, such as coke, charcoal or activated carbon. The fluorinated carbon is represented by the formula $(CF_x)_n$ wherein x varies between about 0.1 to 1.9 and preferably between about 0.5 and 1.2, and $(C_2F)_n$ wherein the n refers to the number of monomer units which can vary widely. The preferred cathode active mixture comprises $CF_x$ combined with a discharge promoter component such as acetylene black, carbon black and/or graphite. Metallic powders such as nickel, aluminum, titanium and stainless steel in powder form are also useful as conductive diluents when mixed with the cathode active mixture of the present invention. Up to about 10 weight percent of the conductive diluent is added to the mixture to improve conductivity.

Solid cathode active components for incorporation into a cell according to the present invention may be prepared by rolling, spreading or pressing a mixture of one or more of the above listed electrode active materials, a discharge promoter component and/or one or more of the enumerated conductive diluents onto the current collector 24 with the aid of a binder material. Preferred binder materials include a powdered fluoro-resin such as powdered polytetrafluoroethylene (PTFE) or powdered polyvinylidene fluoride present at about 1 to about 5 weight percent of the electrode active material. Cathodes prepared as described above may be in the form of one or more plates operatively associated with at least one or more plates of anode material, or in the form of a strip wound with a corresponding strip of anode material in a structure similar to a "jellyroll".

The exemplary cell 10 further includes the combination separator 12 of the present invention disposed intermediate the Group IA anode 18 and the cathode 20 to provide physical separation therebetween. The combination separator has a thickness of about 3 to 4 mils and comprises at least one layer 14 of a non-woven, synthetic polyolefinic cloth superposed with at least one layer 16 of a synthetic polyolefinic film. To prevent movement of the non-woven cloth with respect to the film during cell fabrication, the present separator is provided as two superposed structures, one placed on either side of one of the electrodes such as the cathode. The opposed superposed separator structures are then heat sealed to each other at their peripheries to envelope the electrode.

Both the polyolefinic non-woven cloth 14 and the polyolefinic film 16 are electrically insulative, chemically unreactive with the anode and cathode active materials and are chemically unreactive with and insoluble in the electrolyte. In addition, both separator layers 14, 16 have a degree of porosity sufficient to allow flow therethrough of the electrolyte during the electrochemical reaction of the electrochemical cell 10.

In particular, the non-woven polyolefinic cloth 14 has an open mesh or open weave characteristic that does not act as a barrier to ion flow therethrough. By way of example, the non-woven cloth can be a polyethylene or a polypropylene, open mesh cloth material. A preferred form of the non-woven separator material is a non-woven polypropylene web cloth commercially available from Schuller Web Dynamics, Stroudsburg, Pa., under the designation DYNAWEB® 902x. This material is a melt-blown polypropylene non-woven web with a nominal thickness of 2.5 mils by TMI 549M. Fiber diameter is approximately 3 µm, material porosity is >50%, with a maximum pore size of <15 µm. Air permeability is 6 CFM (cubic feet per minute) using the Frazier method. An alternate non-woven polypropylene cloth useful in the present invention is commercially available from Tonen Tapyrus under the designation TAPYRUS®, part number PO225SW-OCS. The web has a basis weight of 22±2 $g/m^2$ and a nominal thickness of 3 mil. Its resistance to air flow is <<1 sec/30 cc air (1 square inch sample).

The film layer 16 is of a material having mechanical characteristics including tensile strength and percent elongation that compensate for cathode swelling during discharge without the need for increased amounts of film material. The film material has a microporous structure that provides for flow of alkali metal ions therethrough. By way of example, the microporous film material can be a polyethylene or a polypropylene film of the type that may be produced by an extruding, blow molding or casting process. In particular, a preferred form of the synthetic polyolefinic film 16 is a polypropylene film commercially available from Hoechst Celanese Corporation under the designation CELGARD® 3500. The film has a nominal thickness of about 1 mil with a wettability in water of <30 seconds and an electrical resistance of $\leq 5$ m$\Omega$ $in^2$. Its resistance to air flow is $\leq 15$ seconds/$in^2$. The preferred film is a microporous continuous sheet membrane coated with a nonionic surfactant. Preferred surfactants include silicon glycol copolymers, such as polyoxyethylene polymethyl siloxane, either alone or in combination with an imidazoline tertiary amine, phosphate esters such as ethoxylated 2-ethyl-hexyl phosphate and hydrophilic organic hydrocarbon monomers such as acrylic acid, methacrylic acid, vinyl acetate and mixtures thereof, as described in U.S. Pat. Nos. 4,438,185 to Taskier and 4,359,510 to Taskier, the disclosures of which are hereby incorporated by reference. The nonionic surfactant is provided to improve the wettability of the film to the electrolyte.

An alternative polypropylene film useful in the present invention is also commercially available from Hoechst Celanese under the designation CELGARD® 3501. This film is coated with a cationic and nonionic surfactant.

In some cases it may be desired to use polyethylene microporous film and non-woven cloth in the present electrochemical cell. Polyethylene has a lower melting point than polypropylene which is beneficial for shutting down cell discharge when excessive internal heat is generated.

The electrochemical cell 10 of the present invention further includes a nonaqueous, ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic or organic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent or, a single solvent. The ionically conductive salt serves as the vehicle for migration of the anode ions to intercalate or react with the cathode active material. Preferably the ion-forming alkali metal salt is similar to the alkali metal comprising the anode.

In a solid cathode/electrolyte system, the ionically conductive salt preferably has the general formula $MM'F_6$ or $MM'F_4$ wherein M is an alkali metal similar to the alkali metal comprising the anode and M' is an element selected from the group consisting of phosphorous, arsenic, antimony and boron. Examples of salts yielding M'F$_6$ are: hexafluorophosphate (PF$_6$), hexafluoroarsenate (AsF$_6$) and hexafluoroantimonate (SbF$_6$), while tetrafluoroborate (BF$_4$) is exemplary of salts yielding M'F$_4$. Alternatively, the corresponding sodium or potassium salts may be used. Other salts useful with the present invention include LiClO$_4$, LiC(SO$_2$CF$_3$)$_3$, LiN(SO$_2$CF$_3$)$_2$ and LiCF$_3$SO$_3$, and mixtures thereof.

Low viscosity solvents include tetrahydrofuran (THF), methyl acetate (MA), diglyme, trigylme, tetragylme, dimethyl carbonate (DMC), 1,2-dimethoxyethane (DME), diethyl carbonate and mixtures thereof, and high permittivity solvents include cyclic carbonates, cyclic esters and cyclic amides such as propylene carbonate (PC), ethylene carbonate (EC), acetonitrile, dimethyl sulfoxide, dimethyl formamide, dimethyl acetamide, γ-butyrolactone (GBL) and N-methyl-pyrrolidinone (NMP) and mixtures thereof. In the preferred electrochemical cell comprising the Li/CF$_x$ couple, the preferred electrolyte is 1.0M to 1.4M LiBF$_4$ in γ-butyrolactone (GBL).

The combination separator 12 of the present invention is also useful in an alkali metal ion cell. Such rechargeable cells are typically constructed in a discharged state. The alkali metal ion, such as lithium, comprising a lithiated cathode is then intercalated into a carbonaceous anode by applying an externally generated electrical potential to recharge the cell. The applied recharging electrical potential serves to draw the alkali metal ions from the cathode, through the combination separator via the electrolyte and into the carbonaceous material of the anode to saturate the same. The cell is then provided with an electrical potential and is discharged in a usual manner. Particularly useful lithiated materials that are stable in air and readily handled include lithiated nickel oxide, lithiated manganese oxide, lithiated cobalt oxide and lithiated mixed oxides of cobalt with nickel or tin. The more preferred oxides include LiNiO$_2$, LiMn$_2$O$_4$, LiCoO$_2$, LiCo$_{0.92}$Sn$_{0.08}$O$_2$ and LiCo$_{1-x}$Ni$_x$O$_2$.

It is known that oxyhalide electrolytes including such catholytes as thionyl chloride and sulfuryl chloride rapidly degrade polyolefins. In that case, in a cell having an alkali metal anode coupled with a catholyte/depolarizer such as sulfur dioxide or oxyhalides including phosphorized chloride, thionyl chloride and sulfuryl chloride, used individually or in combination with each other or in combination with halogens and interhalogens, such as bromine trifluoride, or other electrochemical promoters or stabilizers, the combination separator 12 of the present invention can include ethylene tetrafluoroethylene copolymer (ETFE) as both the non-woven cloth 14 and the film 16. A polyethylenetetrafluoroethylene separator material is commercially available under the name Tefzel, a trademark of the DuPont Company. In combination with an alkali metal-anode suitable catholytes include thionyl chloride, sulfuryl chloride, chlorinated sulfuryl chloride (CSC), thionyl chloride-bromine chloride (BCX), and mixtures thereof having an alkali metal salt dissolved therein. In such systems, the cathode is comprised of a high surface area carbonaceous admixture formed from a mixture of carbon black/PTFE materials. The carbonaceous admixture including the binder and conductive diluent is formed into a free-standing sheet in a manner similar to that described in U.S. Pat. No. 5,543,249 to Takeuchi et al., which is assigned to the assignee of the present invention and incorporated herein by reference.

While not shown in the drawings, those skilled in the art will readily understand that the casing is provided with a cell header comprising a metallic disc-shaped body with a first hole to accommodate a glass-to-metal seal/terminal pin feedthrough and a hole for electrolyte/catholyte filling. The glass used is a corrosion resistant type, for example, having from about 0% to about 50% by weight silicon such as CABAL 12, TA 23, CORNING 9013, FUSITE 425 or FUSITE 435. The positive terminal pin feedthrough preferably comprises titanium although molybdenum and aluminum, such as an aluminum 52 alloy pin, can also be used. The cell header comprises elements having compatibility with the other components of the electrochemical cell and is resistant to corrosion. The cathode lead is welded to the positive terminal pin in the glass-to-metal seal and the header is welded to the case containing the electrode stack.

The cell is thereafter filled with the electrolyte/catholyte described hereinabove and hermetically sealed such as by close-welding a stainless steel ball over the fill hole, but not limited thereto. This above assembly describes a case-negative cell which is the preferred construction of the cell of the present invention having the combination separator 12 intermediate the anode electrode 18 and the cathode electrode 20 to provide physical separation therebetween, as described above.

The preferred Li/CF$_x$ is constructed having the non-woven cloth 14 facing the cathode 20 and the microporous film 16 facing the anode 18. This configuration is believed to provide an electrolyte rich environment proximate the cathode which benefits improved depth of discharge in the cathode and provides the cell with enhanced pulse discharge characteristics. The nonionic surfactant coated on the microporous film 16 facing the anode 18 is believed to benefit wetting of the anode/electrolyte interphase. The cell of the present invention is particularly adapted for discharge under a light load for extended periods of time such as for routine monitoring of cardiac functions by an implantable cardiac defibrillator and the like. As is well known to those skilled in the art, the exemplary electrochemical system of the present invention can also be constructed in a case-positive configuration.

The following examples describe the manner and process of manufacturing an electrochemical cell according to the present invention, and they set forth the best mode contemplated by the inventors of carrying out the invention, but they are not to be construed as limiting.

EXAMPLE I

Thirty-two prismatic Li/CF$_x$ cells of a central cathode design were constructed, each having 3.15±0.01 gram cathodes consisting essentially of, by weight, 98% carbon monofluoride, 1% PTFE binder, and 1% acetylene black, pressed to chemically-etched titanium screens. Separators were then fashioned into bags and heat-sealed around the individual cathodes. The separator structures investigated are listed in tables 1 and 2 and consisted essentially of:

1) two layers of superposed TAPYRUS® non-woven polypropylene cloth, designated as separator No. 1; 2) two layers of superposed DYNAWEB® 902x non-woven polypropylene cloth, designated as separator No. 2; 3) one layer of CELGARD® 3500 microporous film, designated as separator No. 3; 4) one layer of CELGARD® 3501 microporous film with a surfactant modified surface, designated as separator No. 4; 5) one layer of TAPYRUS®, non-woven polypropylene cloth facing the anode and superposed with one layer of CELGARD® 3500 microporous polypropylene film facing the cathode, designated as separator No. 5; 6) one layer of CELGARD® 3500 microporous film facing the anode and superposed with one layer of TAPYRUS® non-woven cloth facing the cathode, designated as separator No. 6; 7) one layer of DYNAWEB® 902x non-woven polypropylene cloth facing the anode and superposed with one layer of CELGARD® 3500 microporous film facing the cathode, designated as separator No. 7; and 8) one layer of CELGARD® 3500 microporous polypropylene film coated with a non-ionic surfactant facing the anode and superposed with one layer of DYNAWEB® 902X non-woven polypropylene cloth facing the cathode, designated as separator No. 8.

Four cells were built having each of the eight separator structures. Separator No. 7 is the preferred superposed combination in a non-preferred orientation with the non-woven polypropylene cloth facing the anode and the microporous film coated with a non-ionic surfactant facing the cathode. Separator No. 8 is the preferred superposed combination in the preferred orientation according to the present invention.

Anodes were fabricated from lithium metal (nominal weight of 0.74 grams) pressed to chemically-etched nickel screens. Anode halves were placed on opposing sides of the central cathode.

Each cell was filled with 1M $LiBF_4$ in GBL electrolyte at a nominal weight of 3.80 grams. The hermetically-sealed cells were housed in stainless steel cases.

Figure 3:
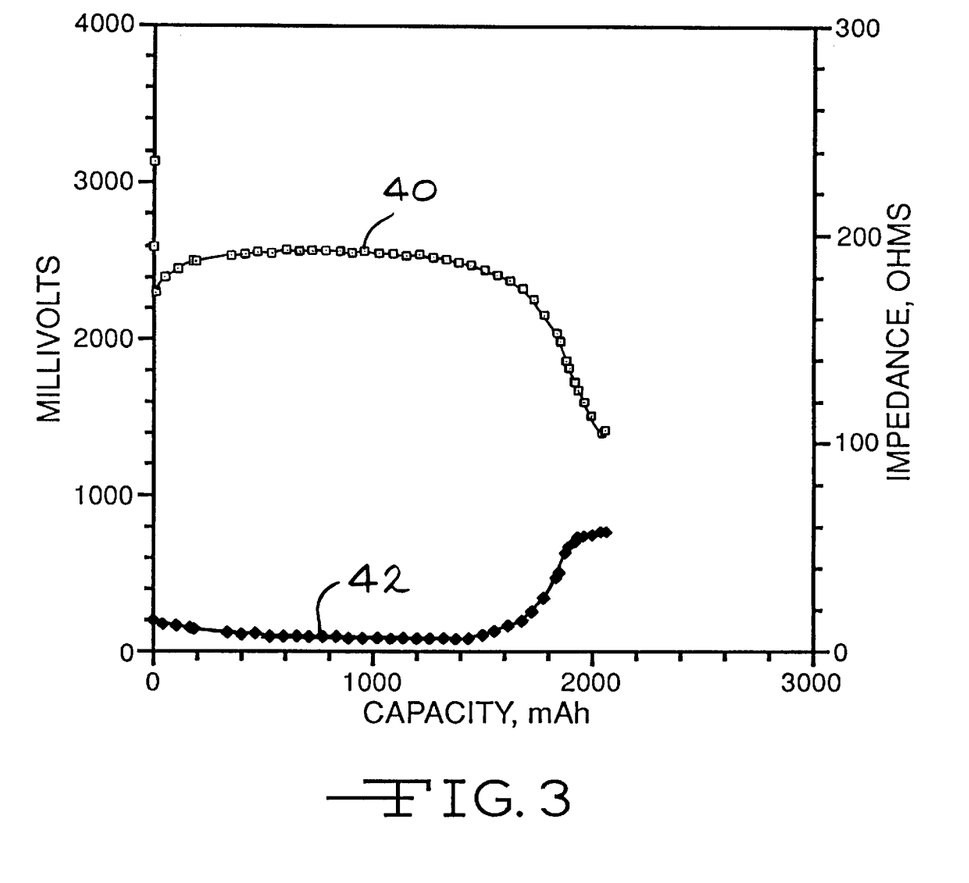
FIG. 3 is a graph constructed from the average discharge of a plurality of Li/CF$_x$ cells, each having a separator made of one layer of polypropylene film according to the prior art.
Figure 4:
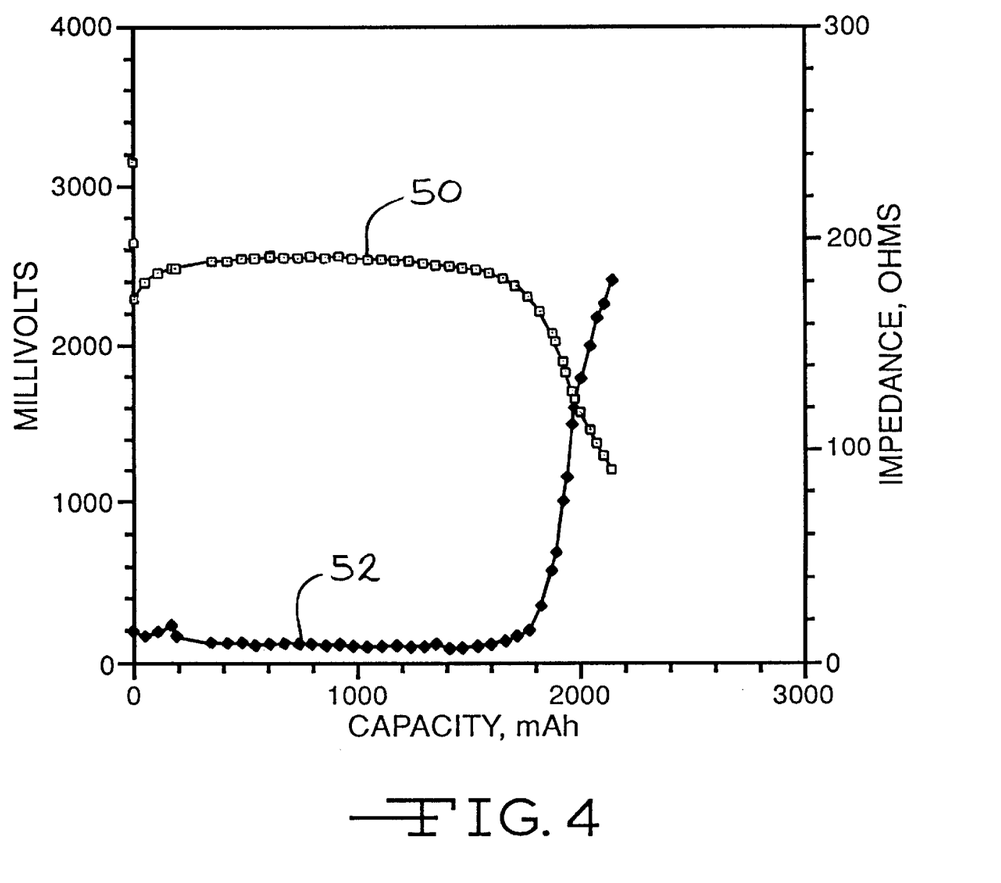
FIG. 4 is a graph constructed from the average discharge of a plurality of Li/CF$_x$ cells, each having a separator combination of one layer of non-woven polypropylene cloth facing the anode and superposed with one layer of polypropylene film facing the cathode.
Figure 5:
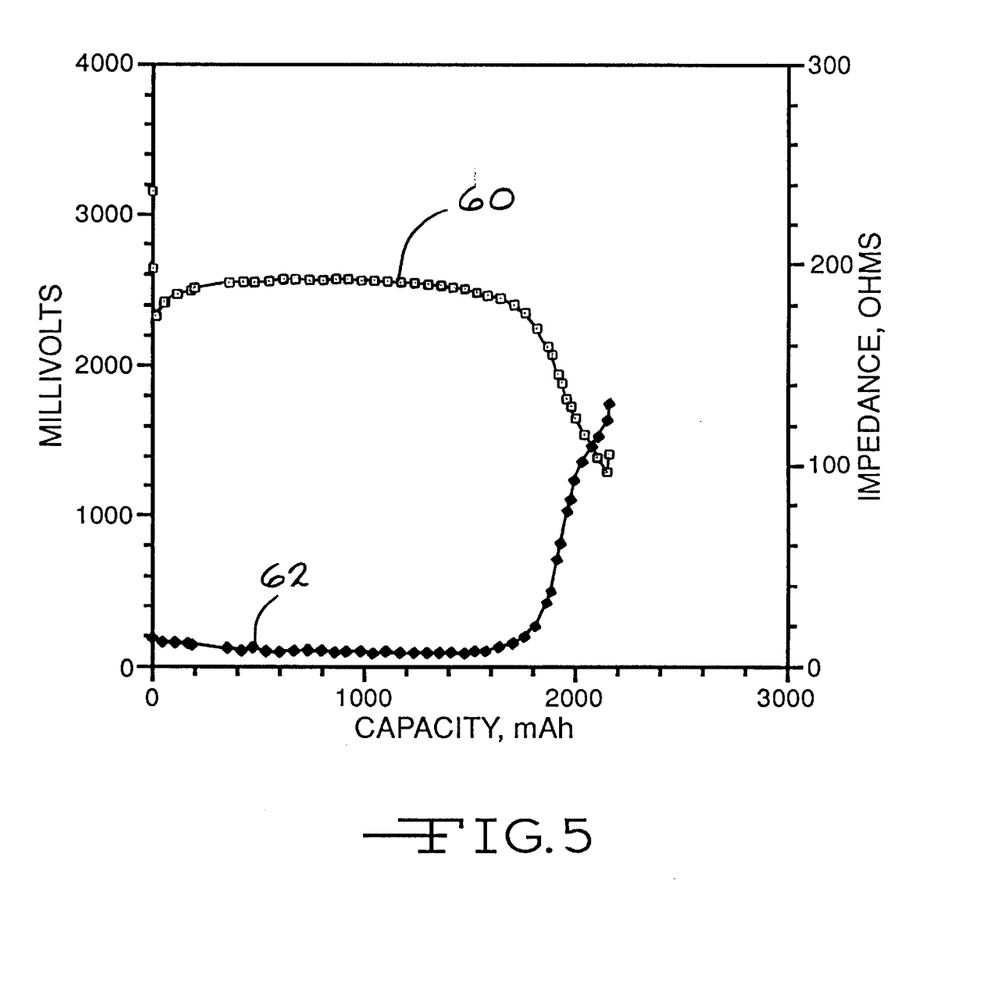
FIG. 5 is a graph constructed from the average discharge of a plurality of lithium/fluorinated carbon (Li/CF$_x$) cells, each having a separator combination of one layer of non-woven polypropylene cloth facing the cathode and superposed with one layer of polypropylene film facing the anode according to the present invention.

Cell burn-in was carried out by discharging the cells at 37° C. under 2 kohm loads for 72 hours. The cells were then placed on open circuit for a minimum of one week prior to the initiation of discharge testing at 37° C. under 1 kohm loads.

microporous film), wherein curve 40 was constructed from the average discharge of those cells and curve 42 was constructed from the average impedances. FIG. 4 is a graph constructed from the discharge of the $Li/CF_x$ cells provided with separator No. 7 (one layer of TAPYRUS®, non-woven polypropylene cloth facing the anode and superposed with one layer of CELGARD® 3500 microporous polypropylene film facing the cathode), wherein curve 50 was constructed from the average discharge of those cells and curve 52 was constructed from the average impedance. FIG. 5 is a graph constructed from the discharge of the $Li/CF_x$ cells provided with separator No. 8 according to the present invention (one layer of CELGARD® 3500 microporous polypropylene film facing the anode and superposed with one layer of DYNAWEB® 902X non-woven polypropylene cloth facing the cathode) wherein curve 60 was constructed from the average discharge of those cells and curve 62 was constructed from the average cell impedance.

Figure 2:
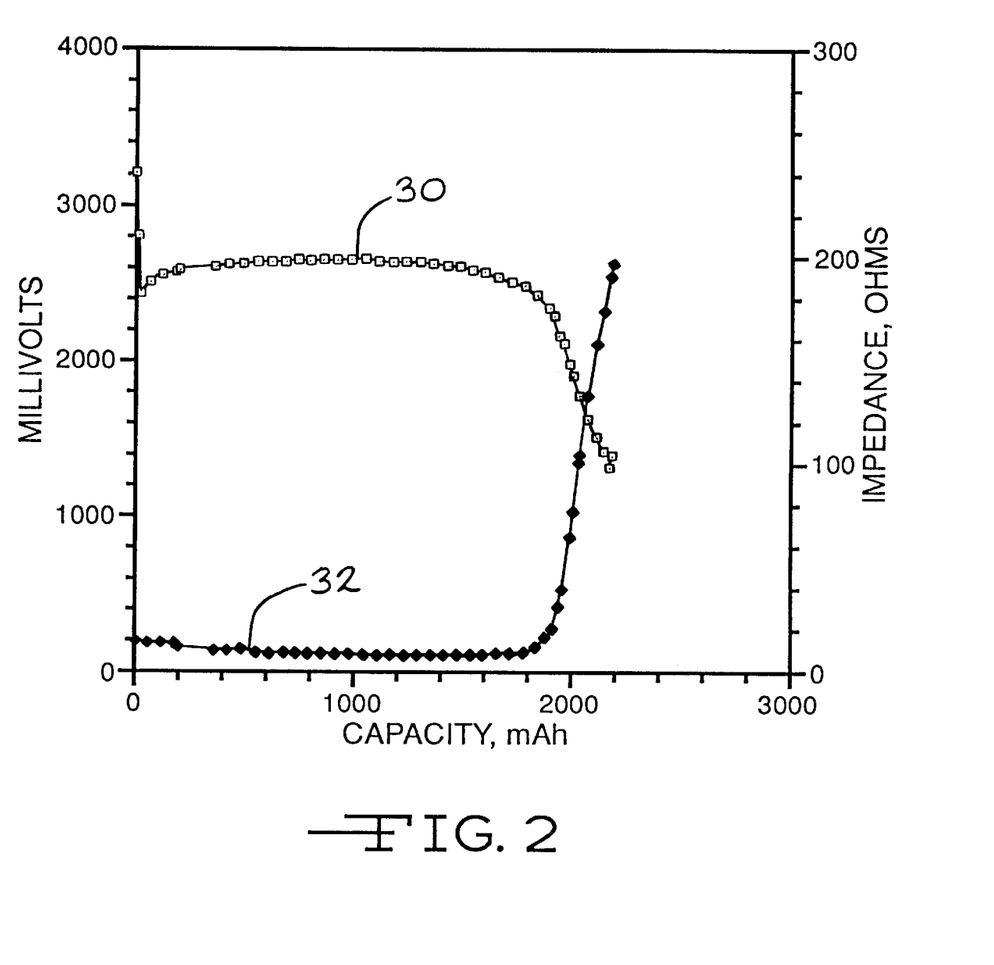
FIG. 2 is a graph constructed from the average discharge of a plurality of Li/CF$_x$ cells, each having a separator made of two layers of superposed non-woven polypropylene cloth according to the prior art.

The preferred separator configuration of the present invention provides a $Li/CF_x$ cell with up to a 60% to 70% reduction in internal impedance and a 4% to 11% increase in delivered capacity over the use of a conventional non-woven cloth separator (FIG. 2). As is apparent from the tables and FIGS. 2 to 5, there is some degradation in delivered capacity (2% at a 1.5V cutoff which is statistically significant) when the preferred microporous film (CELGARD® 3500) is positioned facing the cathode and the superposed preferred non-woven cloth (DYNAWEB® 902x) faces the anode, which is a non-preferred configuration (separator No. 7, FIG. 4) in comparison to placing the microporous film facing the anode and the superposed non-woven web facing the cathode (separator No. 8, FIG. 5),

TABLE 1

| Separator: | 1 | 2 | 3 | 4 | 5 | 6 | 7 | 8 |
|---|---|---|---|---|---|---|---|---|
| Average capacity to 2 V, mAh | 1821.93 | 1976.72 | 1853.03 | 1801.98 | 1727.59 | 1772.97 | 1881.00 | 1899.43 |
| ±1 std. dev. | 50.69 | 12.23 | 55.57 | 78.71 | 35.93 | 12.52 | 11.06 | 39.69 |
| Average capacity to 1.7 V, mAh | 1844.20 | 2048.50 | 1948.54 | 1909.12 | 1753.26 | 1804.36 | 1957.69 | 1988.55 |
| ±1 std. dev. | 51.15 | 11.24 | 54.49 | 73.74 | 36.74 | 12.27 | 15.77 | 28.83 |
| Average capacity to 1.5 V, mAh | 1857.50 | 2106.12 | 2035.18 | 1993.18 | 1770.21 | 1823.61 | 2026.53 | 2069.21 |
| ±1 std. dev. | 51.20 | 7.29 | 70.56 | 78.39 | 37.66 | 11.32 | 17.68 | 27.65 |

TABLE 2

| Separator: | 1 | 2 | 3 | 4 | 5 | 6 | 7 | 8 |
|---|---|---|---|---|---|---|---|---|
| Average impedance at 2 V, Ω | 127.39 | 56.08 | 40.73 | 38.13 | 144.25 | 144.49 | 65.41 | 51.33 |
| ±1 std. dev. | 17.42 | 1.57 | 6.11 | 3.65 | 10.98 | 17.86 | 5.13 | 9.64 |
| Average impedance at 1.7 V, Ω | 304.43 | 127.58 | 57.95 | 51.50 | 340.83 | 322.74 | 136.85 | 100.14 |
| ±1 std. dev. | 38.29 | 3.69 | 10.23 | 12.38 | 16.13 | 37.98 | 8.50 | 15.78 |
| Average impedance at 1.5 V, Ω | 444.21 | 180.41 | 58.34 | 53.97 | 515.12 | 483.54 | 177.17 | 123.52 |
| ±1 std. dev. | 68.13 | 5.74 | 6.48 | 11.84 | 15.02 | 49.35 | 12.14 | 23.10 |

Average capacity measurements for each of the cell groups were calculated at 2 Volt, 1.7 Volt and 1.5 Volt cut-offs. The results are presented in Table 1. Average impedance was also calculated for each cell group at the respective cut-offs, and the results are presented in Table 2. Furthermore, FIG. 2 is a graph constructed from the discharge of the $Li/CF_x$ cells provided with separator No. 2 (two layers of superposed DYNAWEB® 902x non-woven polypropylene cloth), wherein curve 30 was constructed from the average discharge of those cells and curve 32 was constructed from the average impedances. FIG. 3 is a graph constructed from the discharge of the $Li/CF_x$ cells provided with separator No. 3 (one layer of CELGARD® 3500 which is the preferred separator configuration. The average impedance in the cells used to construct FIGS. 2 and 4 is also greater at each voltage cutoff when just the cloth is used or the anode-cloth/film-cathode configuration is used.

EXAMPLE II

To determine the resistance to ionic transfer of the superposed separator of the present invention, five (5) samples of the combination separator were subjected to air flow resistance testing. The combination separator had a thickness of about 2.5 to 3.0 mils. Air flow resistance was carried out on the samples with the air passing first through the non-woven cloth then the microporous film (Test No. 1) and with the air passing first through the microporous film then the non-woven cloth (Test No. 2). The results are indicated in seconds in Table 3.

TABLE 3

| Separator | Test No. 1 (seconds) | Test No. 2 (seconds) |
|---|---|---|
| 1 | 9.624 | 10.035 |
| 2 | 9.739 | 9.923 |
| 3 | 9.797 | 9.945 |
| 4 | 9.729 | 10.181 |
| 5 | 9.771 | 10.027 |
| Avg. | 9.732 | 10.022 |

Similar air flow resistance tests were performed on samples of combination separator material obtained from Hoechst Celanese Corporation under the designation CELGARD® 5550 comprising one layer of non-woven propylene cloth laminated with one layer of polypropylene film having a blend of non-ionic and cationic surfactants coated thereon. The prior art laminated separator had a thickness of about 3.0 to 4.0 mils. The mean resistance to air flow for the air passing first through the microporous film then the laminated non-woven cloth was 19.3±4.0 seconds. With the air passing first through the microporous film then the laminated non-woven cloth, the mean air flow resistance was 19.2±3.3 seconds.

It should be pointed out that the 5550 separator included the film component having a blend of non-ionic and cationic surfactants while the superposed combination separator of the present invention only has a non-ionic surfactant coated on the polypropylene film. However, Hoechst Celanese also manufactures a laminated separator designated K460 consisting of one layer of polypropylene film laminated to one layer of non-woven polypropylene cloth. The K460 separator has no surfactant component. The air flow resistance for the K460 separator is listed in the Hoechst Celanese literature as 9.3 seconds, which is similar to that of the present separator, as set forth in Table 3. In other words, the present combination separator with a polypropylene film having a non-ionic surfactant has a similar air flow resistance to that of the K460 laminated separator devoid of any surfactants. This is likely the result of the present separator being a superposed combination in comparison to the K460 separator being a laminate. Then, when a surfactant is added to a prior art laminated separator, that consequently increases the air flow resistance. The Hoechst Celanese 3501 separator, which is a 1 mil polypropylene film provided with a blend of non-ionic and cationic surfactants and having an air flow resistance of >200, gives an indication of the effect that surfactants have on the ionic transfer characteristics of a separator structure.

Thus, the superposed combination separator of the present invention is resistant to degradation in the cell environment, possesses sufficient thickness to maintain interelectrode separation, has sufficient surface energy to promote electrolyte wettability and absorption, has relatively high electrical resistivity to prohibit the establishment of short circuit currents flowing directly between the electrodes through the separator, and additionally has sufficient porosity to allow ionic transfer within the electrolyte to occur unimpeded during intended cell discharge.

It is intended that the foregoing description of the preferred embodiments of the present invention be only representative, and that the present invention be only limited by the hereinafter appended claims.

What is claimed is:

1. An electrochemical cell comprising:
   (a) an anode comprising an anode active material in contact with an anode current collector;
   (b) a cathode comprising an electrode active material in contact with a cathode current collector;
   (c) a separator provided between the anode and the cathode, the separator consisting essentially of a first, non-woven fabric of a polyolefinic material superposed with a second, microporous polyolefinic film to prevent internal electrical short circuit conditions, wherein the second, microporous polyolefinic film is coated with a surfactant; and
   (d) an electrolyte activating the anode and the cathode.

2. The electrochemical cell of claim 1 wherein the first, non-woven fabric of the polyolefinic material faces the cathode and the second, microporous polyolefinic film faces the anode.

3. The electrochemical cell of claim 1 wherein the polyolefinic material comprising the first, non-woven fabric of the separator is selected from the group consisting of polypropylene and polyethylene.

4. The electrochemical cell of claim 1 wherein the polyolefinic material comprising the second, microporous film of the separator is selected from the group consisting of polypropylene and polyethylene.

5. The electrochemical cell of claim 1 wherein the surfactant is selected from the group consisting of silicon glycol copolymers; mixtures of silicon glycol copolymers and at least one imidazoline tertiary amine; ethoxylated 2-ethylhexyl phosphate; vinyl acetate; acrylic acid; and methacrylic acid.

6. The electrochemical cell of claim 1 wherein the first, non-woven fabric is of polypropylene and faces the cathode and wherein the second, microporous film is of polypropylene coated with a nonionic surfactant and faces the anode.

7. The electrochemical cell of claim 1 wherein the anode is selected from the group consisting of lithium, a lithium alloy, sodium, potassium, calcium and magnesium.

8. The electrochemical cell of claim 1 wherein the cathode is of a solid material selected from the group consisting of manganese dioxide, carbon, fluorinated carbon, silver vanadium oxide, copper vanadium oxide, copper silver vanadium oxide, titanium disulfide, copper oxide, copper sulfide, iron sulfide and iron disulfide, and mixtures thereof.

9. The electrochemical cell of claim 1 wherein the electrolyte includes an alkali metal salt dissolved therein.

10. The electrochemical cell of claim 9 wherein the alkali metal salt has the general formula $MM'F_6$ or $MM'F_4$ and wherein M is an alkali metal the same as the alkali metal comprising the anode and M' is an element selected from the group consisting of phosphorous, arsenic, antimony and boron.

11. The electrochemical cell of claim 9 wherein the alkali metal salt dissolved in the electrolyte solution is selected from the group consisting of $LiPF_6$, $LiAsF_6$, $LiSbF_6$, $LiBF_4$, $LiClO_4$, $LiAlCl_4$, $LiGaCl_4$, $LiC(SO_2CF_3)_3$, $LiN(SO_2CF_3)_3$, $LiCF_3SO_3$, $LiSO_3F$ and $LiB(C_6H_5)_4$, and mixtures thereof.

12. The electrochemical cell of claim 1 wherein the electrolyte comprises an organic solvent selected from the group consisting of tetrahydrofuran, propylene carbonate, methyl acetate, acetonitrile, dimethyl sulfoxide, dimethyl formamide, dimethyl carbonate, diethyl carbonate, dimethyl acetamide, γ-butyrolactone, N-methyl-pyrrolidinone, ethylene carbonate, diglyme, triglyme, tetraglyme, 1,2-dimethoxyethane, and mixtures thereof.

13. The electrochemical cell of claim 1 wherein the cell is rechargeable and is initially constructed in a discharged state having a carbonaceous anode and a lithiated cathode selected from the group consisting of lithiated nickel oxide, lithiated manganese oxide, lithiated cobalt oxide and lithiated mixed oxides of cobalt with nickel or tin.

14. An electrochemical cell comprising:
(a) an anode comprising lithium as an anode active material in contact with an anode current collector;
(b) a cathode comprising fluorinated carbon as an electrode active material in contact with a cathode current collector;
(c) a separator provided between the anode and the cathode, the separator consisting essentially of a first, non-woven fabric of polypropylene facing the cathode and superposed with a second, microporous polypropylene film facing the anode to prevent internal electrical short circuit conditions, wherein the second, microporous polyolefinic film is coated with a surfactant; and
(d) an electrolyte activating the anode and the cathode.

15. The electrochemical cell of claim 14 wherein the surfactant is selected from the group consisting of silicon glycol copolymers; mixtures of silicon glycol copolymers and at least one imidazoline tertiary amine; ethoxylated 2-ethyl-hexyl phosphate; vinyl acetate; acrylic acid; and methacrylic acid.

16. In an electrochemical cell comprising:
an anode having an anode active material in contact with an anode current collector; a cathode comprising an electrode active material in contact with a cathode current collector; a separator disposed between the anode and the cathode to prevent internal electrical short circuit conditions; and an electrolyte activating and operatively associating the anode with the cathode, the improvement comprising:
the separator consisting essentially of a first, non-woven fabric of a polyolefinic material superposed with a second, microporous polyolefinic film, wherein the second, microporous polyolefinic film is coated with a surfactant.

17. The electrochemical cell of claim 16 wherein the polyolefinic material comprising the first, non-woven fabric of the separator is selected from the group consisting of polypropylene and polyethylene.

18. The electrochemical cell of claim 16 wherein the polyolefinic material comprising the second, microporous film of the separator is selected from the group consisting of polypropylene and polyethylene.

19. The electrochemical cell of claim 16 wherein the first, non-woven fabric faces the cathode and the second, microporous film faces the anode.

20. The electrochemical cell of claim 16 wherein the surfactant is selected from the group consisting of silicon glycol copolymers; mixtures of silicon glycol copolymers and at least one imidazoline tertiary amine; ethoxylated 2-ethyl-hexyl phosphate; vinyl acetate; acrylic acid; and methacrylic acid.

21. The electrochemical cell of claim 16 wherein the first, non-woven fabric is of polypropylene and faces the cathode and wherein the second, microporous film is of polypropylene coated with a nonionic surfactant and faces the anode.

22. An electrochemical cell comprising:
(a) an anode comprising lithium as an anode active material in contact with an anode current collector;
(b) a cathode current collector comprising a carbonaceous material;
(c) a separator provided between the anode and the cathode, the separator consisting essentially of a first, non-woven fabric of ethylene tetrafluoroethylene copolymer facing the cathode current collector superposed with a second, microporous ethylene tetrafluoroethylene copolymer film coated, with a surfactant and facing the anode; and
(d) a catholyte.

23. The electrochemical cell of claim 22 wherein the surfactant is selected from the group consisting of silicon glycol copolymers; mixtures of silicon glycol copolymers and at least one imidazoline tertiary amine; ethoxylated 2-ethyl-hexyl phosphate; vinyl acetate; acrylic acid; and methacrylic acid.

24. A separator provided between an anode and a cathode activated and operatively associated with each other by an electrolyte in an electrochemical cell, wherein the separator consists essentially of a first, non-woven fabric of a polyolefinic material superposed with a second, microporous polyolefinic film, and wherein the second, microporous film is coated with a surfactant.

25. The separator of claim 24 wherein the polyolefinic material comprising the first, non-woven fabric of the separator is selected from the group consisting of polypropylene and polyethylene.

26. The separator of claim 24 wherein the polyolefinic material comprising the second, microporous polyolefinic film of the separator is selected from the group consisting of polypropylene and polyethylene.

27. The separator of claim 24 wherein first, non-woven fabric faces the cathode and the second, microporous film faces the anode.

28. The separator of claim 24 wherein the surfactant is selected from the group consisting of silicon glycol copolymers; mixtures of silicon glycol copolymers and at least one imidazoline tertiary amine; ethoxylated 2-ethyl-hexyl phosphate; vinyl acetate; acrylic acid; and methacrylic acid.

29. The separator of claim 24 wherein the first, non-woven fabric is of polypropylene and faces the cathode and wherein the second, microporous film is of polypropylene coated with a nonionic surfactant and faces the anode.

* * * * *